Aug. 7, 1934.  S. OSTROFF  1,969,415
REAR VIEW MIRROR FOR MOTOR VEHICLES
Filed Feb. 6, 1934
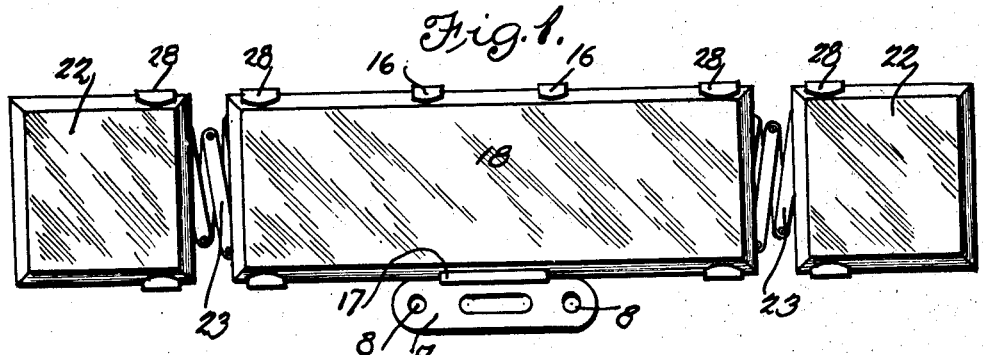
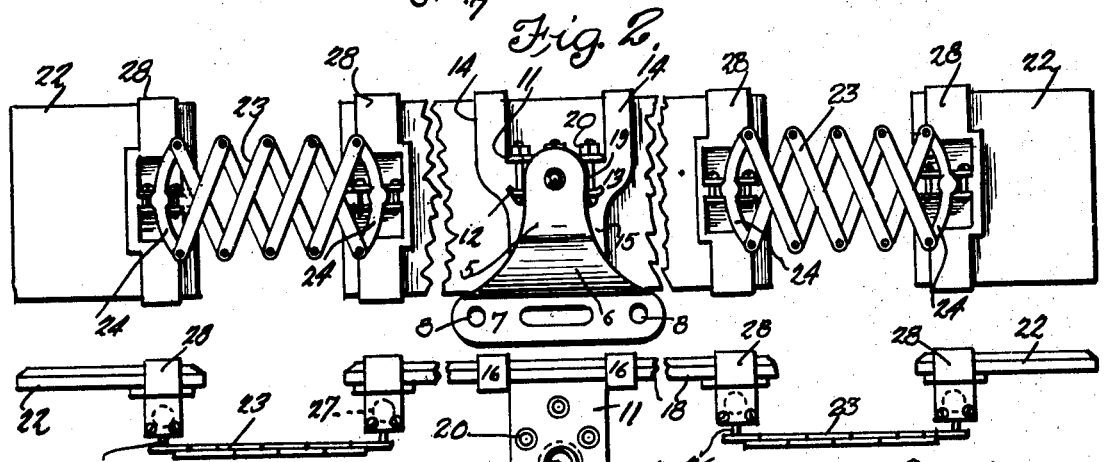
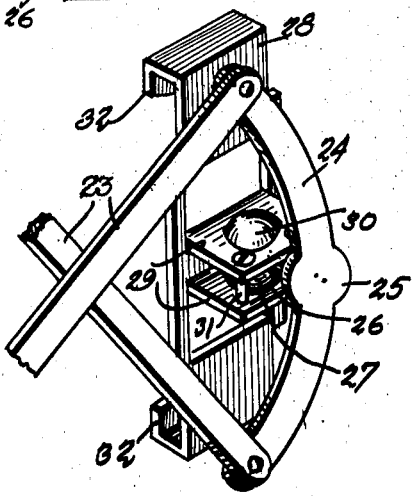
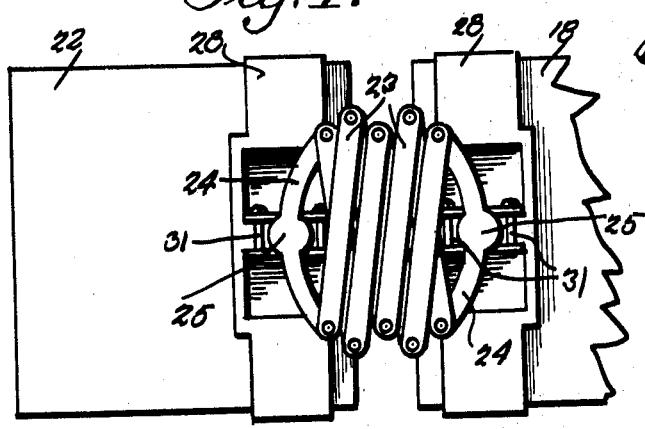
Inventor
Sidney Ostroff.
By
F. N. Bryant.
Attorney.

Patented Aug. 7, 1934

1,969,415

UNITED STATES PATENT OFFICE 1,969,415

REAR VIEW MIRROR FOR MOTOR VEHICLES

Sidney Ostroff, Lowell, Mass.

Application February 6, 1934, Serial No. 709,998

3 Claims. (Cl. 45—97)

This invention relates to rear view mirrors for motor vehicles.

The primary object of the invention is to provide a rear view mirror for motor vehicles having side wings presenting angular mirrors to allow the driver rear vision on both sides of the vehicle.

A further object of this invention is to provide side wings or mirrors on the usual rear vision mirror connected by means of toggle levers arranged in lazy-tong fashion whereby said side wings or mirrors may be moved toward or away from the usual rear view mirror and in angular adjustment relative thereto.

A still further object of this invention is to provide a rear vision mirror having side wings which are further held in place by means of ball and socket connections whereby the angularity of the side wings or mirrors may be adjusted to an unlimited degree.

A still further object of this invention is to provide novel mirror clamping brackets having struck-out portions adapted to form sockets for the ball connections between the lazy tongs and the brackets.

Other objects and advantages of the invention will become apparent during the course of the following description, taken with the drawing, in which, Figure 1 is a front elevational view of the rear view mirror embodying the invention;

Figure 2 is a rear elevational view of the same;

Figure 3 is a top elevational view illustrating the manner in which the side wings or mirrors are connected to the central rear vision mirror;

Figure 4 is an enlarged fragmentary rear elevational view of one of the wings illustrating in detail a lazy tong connection with the central mirror;

Figure 5 is an enlarged fragmentary perspective view of one of the mirror clamps employed for connecting the lazy tongs with the mirror plate; and Figure 6 is a fragmentary elevational view of another form of lazy-tong construction for the support of the side mirrors.

In the drawing, the reference character 5 designates a triangular shaped bracket including an offset portion 6 having a base portion 7 adapted to be secured above the windshield of a motor vehicle by passing bolts or screws through the openings 8. The upper portion of the bracket 5 is provided with a stud 9 on the end of which is carried a ball 10 adapted to engage between clamping plates 11 and 12 of a bracket 13. The clamping plates 11 and 12 are formed integral with the mirror clamping bracket 13 and said bracket is provided with upwardly extending arms 14 and a downwardly extending portion 15. The upwardly extending arms 14 have their free ends return-bent as at 16, while the downwardly extending portion 15 is provided with a return-bent free end 17.

The return-bent ends 16 and 17 are adapted to embrace a rear vision mirror 18 and it will be readily observed that the mirror 18 upon the bracket 13 may be adjusted in any desired angular position by reason of the ball and socket connection 10 and 11. The clamping plates 11 and 12 may be drawn together by means of suitable screws 19 having threaded on the ends thereof nuts 20. The clamping plates 11 may be provided with enlarged openings 21 to form a socket for the ball 10 or they may be struck out to form depressions therefor.

Secured to opposite ends of the rear vision mirror 18 are side mirrors 22 connected as by means of lazy-tongs 23 having end bars 24 provided with enlarged circular portions 25 having laterally projecting studs 26 on the end of which is carried a ball 27.

The balls 27 are connected to mirror holding brackets 28 which are constructed according to the showing in Figure 5 including the struck-out portions 29 forming right angular extending plates having semi-spherical depressions 30. The balls 27 of each of the arcuately curved bars 24 are received between the plates 29 and enter the depressions 30 while screws 31 are passed through openings formed in the struck-out plates 29 and have their free ends received in screw threaded portions formed in the opposite struck-out plate. The pivotal connection between the links 23 of the lazy-tong construction possesses sufficient friction to hold the parts thereof and the end mirror supported thereby in adjusted position and any appropriate form of linkage may be employed. Another form of linkage is shown in Figure 6 wherein the links 23a have pin and slot connections 23b at the crossing point.

It will be noted that the brackets are provided with return-bent ends 32 for engaging the ends of the mirrors as is clearly shown in Figures 1 to 5. It will be noted that the mirror 18 is provided on its opposite ends with brackets 28 while the side wings 22 are also provided with identically constructed brackets 28.

It is to be understood that the form of the invention herewith shown and described is to be taken as the preferred embodiment of the same and that various changes in the shape, size and arrangement of parts may be resorted to without departing from the spirit and scope of the invention as claimed.

I claim:—

1. A rear view mirror for motor vehicles comprising a bracket capable of being secured to a support, a mirror adjustably secured to the bracket, clamping bars secured to opposite portions of the mirror, a series of lazy-tong levers secured to each clamping bar, and a mirror secured to the free end of each series of the lazy-tong levers.

2. A rear view mirror for motor vehicles comprising a bracket, a mirror secured to the bracket, side wing mirrors for the first mentioned mirror, clamping bars secured to the ends of the first mirror, clamping bars secured to the side wing mirrors, spherical socket members carried by the clamping bars, a series of lazy-tong levers, and spherical members carried by the end of each series of lazy-tong levers adapted to be received in the spherical socket member.

3. A rear view mirror for motor vehicles comprising a bracket, an elongated mirror adjustably carried by the bracket, rectangular side wing mirrors for the elongated mirror, clamping bars secured on the ends of the elongated mirror, clamping bars secured to the rectangular mirrors and means for connecting the rectangular mirrors with the elongated mirror whereby said rectangular mirrors may be adjusted angularly relative thereto and may be moved toward and away therefrom.

SIDNEY OSTROFF.